(12) United States Patent
Welle et al.

(10) Patent No.: US 10,948,333 B2
(45) Date of Patent: Mar. 16, 2021

(54) RADAR LEVEL INDICATOR HAVING A SHORT MEASUREMENT TIME

(71) Applicant: VEGA GRIESHABER KG, Wolfach (DE)

(72) Inventors: Roland Welle, Hausach (DE); Joerg Boersig, Schapbach (DE); Karl Griessbaum, Muehlenbach (DE)

(73) Assignee: VEGA GRIESHABER KG, Wolfach (DE)

( * ) Notice: Subject to any disclaimer, the term of this patent is extended or adjusted under 35 U.S.C. 154(b) by 199 days.

(21) Appl. No.: 15/974,437

(22) Filed: May 8, 2018

(65) Prior Publication Data

US 2018/0328774 A1 Nov. 15, 2018

(30) Foreign Application Priority Data

May 9, 2017 (EP) .................................... 17170169

(51) Int. Cl.
| | |
|---|---|
| *G01F 23/284* | (2006.01) |
| *G01F 23/00* | (2006.01) |
| *G01L 9/00* | (2006.01) |
| *H01Q 1/22* | (2006.01) |

(52) U.S. Cl.
CPC ........ *G01F 23/284* (2013.01); *G01F 23/0069* (2013.01); *G01L 9/00* (2013.01); *H01Q 1/225* (2013.01); *G01F 23/0076* (2013.01)

(58) Field of Classification Search
CPC ............... G01F 23/284; G01F 23/0069; G01F 23/0076; G01L 9/00; H01Q 1/225

USPC ......................................................... 342/124
See application file for complete search history.

(56) References Cited

U.S. PATENT DOCUMENTS

| | | | |
|---|---|---|---|
| 5,072,220 A * | 12/1991 | Petschacher | .......... H03M 1/146 341/134 |
| 5,245,347 A | 9/1993 | Bonta et al. | |
| 7,334,470 B1 | 2/2008 | Bartoli et al. | |
| 7,683,780 B2 * | 3/2010 | Reynolds | ............... B82Y 25/00 340/10.1 |
| 2008/0034863 A1 | 2/2008 | Bartoli et al. | |

(Continued)

FOREIGN PATENT DOCUMENTS

| | | |
|---|---|---|
| DE | 10 2004 022 911 A1 | 12/2005 |
| EP | 2 369 362 A1 | 9/2011 |

(Continued)

OTHER PUBLICATIONS

EP office action, EP17170169.1, dated Feb. 21, 2018 (Year: 2018).*

(Continued)

*Primary Examiner* — Frank J McGue
(74) *Attorney, Agent, or Firm* — Oblon, McClelland, Maier & Neustadt, L.L.P.

(57) ABSTRACT

A radar level indicator comprising a processor, an analogue-digital converter circuit and an intermediate memory connected therebetween. The intermediate memory is configured to receive digital signals from the analogue-digital converter circuit at a first data rate. The processor is configured to read out the intermediate memory at a second data rate that is different from the first data rate. It is thus possible to reduce the transmission time while maintaining the same energy requirement.

15 Claims, 6 Drawing Sheets

(56) References Cited

U.S. PATENT DOCUMENTS

2014/0002274 A1    1/2014  Nilsson et al.

FOREIGN PATENT DOCUMENTS

EP           2 677 285 A2   12/2013
WO      WO 03/019120 A1    3/2003

OTHER PUBLICATIONS

Office Action dated Nov. 12, 2020 in Europe Patent Application No. 17 176 1-1001. (7 pages).
Office Action dated Dec. 11, 2020 in China Patent Application No. 201810408499.8; 8 pages.

* cited by examiner

RADAR LEVEL INDICATOR HAVING A SHORT MEASUREMENT TIME

CROSS-REFERENCE TO RELATED APPLICATIONS

This application claims the benefit of the filing date of European Patent Application No. 17 170 169.1, filed on 9 May 2017, the disclosure of which is hereby incorporated herein by reference.

FIELD

The disclosure relates to measurement devices for industrial process automation. In particular, the disclosure relates to a radar level indicator, a measurement device circuit for a measurement device, a method for acquiring and processing measurement data from a measurement device, a program element and a computer-readable medium.

BACKGROUND

Radar devices for fill level measurement are often based on the Frequency Modulated Continuous Wave ("FMCW") method. Said systems are generally supplied with power via a two-wire line, with the result that microwave components having a high power requirement can be operated only by implementing sophisticated energy management and energy-saving circuitry.

An important system parameter when designing FMCW systems is the time period T during which the system emits a microwave signal towards the filling material surface. During this time period T, all high-frequency components, all analogue signal processing components and the analogue-digital converter must be supplied with power. The power used per measurement cycle is thus directly related to the specification of the time period T, and can be reduced by reducing the measurement time.

SUMMARY

The present disclosure describes specifying a radar level indicator and, more generally, a measurement device circuit that has a transmission time that is as short as possible, even when the power supply is limited.

The described embodiments, together with further advantages, will be best understood by reference to the following detailed description taken in conjunction with the accompanying drawings. A described embodiment relates to a radar level indicator comprising a processor and an analogue-digital converter circuit, the radar level indicator being designed to carry out the method described below. An intermediate memory component is provided between the analogue-digital converter circuit and the processor, which memory component interconnects these two units. The intermediate memory component is used for receiving digital signals from the analogue-digital converter circuit at a first data rate. The processor is designed to read out the intermediate memory component at a second data rate that is different from the first data rate.

The intermediate memory component can thus be designed to convert the first data rate or sampling rate into the second data rate or second sampling rate, and to then make this available in the processor. It is possible for the digital signals of the analogue-digital converter circuit to be transmitted physically to the intermediate memory component in the form of voltage signals, via a line and not via the contents of a memory location. It is also possible for the data stored in the intermediate memory component to be transmitted physically to the processor in the form of voltage signals, via a further line.

According to one embodiment, the first data rate is higher, or even significantly higher, than the second data rate. This makes it possible to use processors that work more slowly and are more energy-saving.

According to one embodiment, the analogue-digital converter circuit is designed to generate the digital signals in the form of a differential output signal. For this purpose, the analogue-digital converter circuit may comprise what is known as a Low-Voltage Differential Signaling ("LVDS") interface.

The processor may comprise an asymmetric interface for reading out the intermediate memory component. In this case, the processor is connected to the intermediate memory component via an asymmetrical communication line, whereas the analogue-digital converter circuit is connected to the intermediate memory component via a symmetrical communication or data transmission line.

According to one embodiment, the intermediate memory component is a programmable logic component, in particular an FPGA ("Field Programmable Gate Array") component in combination with a data memory.

According to one embodiment, the intermediate memory component is supplied with an external operating clock signal in a first operating phase, and is separated from the operating clock signal in a second operating phase. The external operating clock signal can be provided by the processor. The intermediate memory component does not change its memory content during the separation from an external operating clock signal. Energy can thus be saved.

According to one embodiment, the intermediate memory component is supplied with a supply voltage in a third operating phase, and is separated from a supply voltage in a fourth operating phase. The separation from a supply voltage can also be brought about by reducing the supply voltage. Energy can thus be saved.

According to one embodiment, the intermediate memory component is configured with a logic program, by means of a master control unit, during the first operating phase and/or the third operating phase. It is possible in particular for the master control unit to be integrated in the processor.

According to one embodiment, the first operating phase, the second operating phase, the third operating phase and/or the fourth operating phase are activated alternately or simultaneously. The activation can be carried out by the processor.

According to one embodiment, the digital signals that are emitted by the analogue-digital converter circuit toy the intermediate memory component may be digital sampling values of the received signal of the radar level indicator (or, more generally, of the measurement device). In the case of a radar level indicator, the received signal is typically the transmission signal of the radar level indicator that is reflected by the filling material surface and other reflectors.

The intermediate memory component can be designed to process the received digital signals of the analogue-digital converter circuit. It is possible in particular for the intermediate memory component to calculate a measured value or a plurality of measured values therefrom, or to carry out signal pre-processing, with the result that the downstream processor can calculate the measured value in a manner requiring less effort.

According to a further embodiment, the intermediate memory component comprises a first in, first out memory and/or a circular buffer.

According to a further embodiment, the measurement device circuit, and in particular the radar level indicator, is designed for connection to a 4-20 mA two-conductor loop for supplying power to the measurement device and for outputting the measured values, as well as for further communication with an external operation device.

A further aspect relates to a measurement device circuit for a measurement device, for example a fill level measurement device, a limit measurement device, a pressure measurement device or a flow measurement device. The measurement device comprises a processor, an analogue-digital converter circuit and an intermediate memory component. Said elements correspond to the elements, described above, of the radar level indicator.

The features described above and in the following can also be implemented in other measurement device circuits. At this point, it should be noted that the features described in the following with reference to the method can be implemented by the elements of the measurement device circuits and various radar level indicator systems. In contrast, the features described in the following with reference to the radar level indicator can be used as method steps.

A further aspect relates to a method for acquiring and processing measurement data of a measurement device, in particular a measurement device for process automation, such as a fill level measurement device, a pressure measurement device, a limit level sensor or a flow measurement device. After an intermediate memory component has been activated, digital signals are received in the intermediate memory component. The digital signals correspond to the measurement data acquired, for example a transmission signal from an analogue-digital converter circuit at a first data rate, which signal is received by the device and reflected at the filling material surface. The processor is then activated, and the intermediate memory component is read out by the processor at a second data rate which is different from the first data rate. Advantageously, the second data rate is lower than the first data rate. Subsequently, the intermediate memory component is deactivated, for example by switching off the clock signal of the intermediate memory component. Subsequently, the processor and/or the intermediate memory component calculates the measured value from the digital signals and said value is then output by the measurement device or the processor.

According to a first embodiment, the measured value can be calculated in the processor, according to a further embodiment said value can be calculated in the intermediate memory component, and according to a further embodiment said value can be calculated by means of the processor cooperating with the intermediate memory component.

The processor is then put into a sleep mode, in order to save energy, after which the intermediate memory component can be activated again.

A further aspect relates to a program element which, when executed on a measurement device circuit, described above and in the following, instructs the measurement device circuit to carry out the method steps described above and in the following.

Another aspect relates to a computer-readable medium, on which the above-described program element is stored.

Another aspect relates to the use of a measurement device circuit, as described above and in the following, for limit measurement. Another aspect relates to the use of a measurement device circuit of this kind for pressure measurement, and another aspect relates to the use of a measurement device circuit of this kind for flow measurement.

Reducing the measurement time increases the required working frequency of the analogue-digital converter circuit. The analogue-digital converter circuit has a relatively high working frequency, and it is possible for said circuit to transmit the digital data to the intermediate memory in a differential manner. The for example digitally programmable intermediate memory component is used as a converter between the rapid differential output signals of the analogue-digital converter circuit and the typically asymmetric signal inputs of the energy-saving processor.

An important aspect is that at least one processor and at least one analogue-digital converter circuit, as well as at least one intermediate memory component, are provided, the intermediate memory component receiving digital sampling values from the at least one analogue-digital converter circuit at a first data rate, and the processor reading out digital sampling values from the intermediate memory component at a second data rate, the first data rate being different from the second data rate.

Another, independent aspect can be considered to be the fact that an energy-saving measurement device circuit, for example for a fill level measurement device, is provided, which circuit comprises at least one analogue-digital converter circuit having a differential output signal, at least one processor having at least one asymmetric input and at least one intermediary component that is connected to the processor by means of at least one asymmetrical communication line and is connected to the analogue-digital converter circuit by means of at least one symmetrical data transmission line. The intermediary component is, for example, the intermediate memory component mentioned above.

According to one embodiment, the deactivation of the analogue-digital converter circuit and/or of the intermediate memory component can be triggered by the power available to the measurement device falling below a specified measured value. This is intended to prevent the measurement device running into energy deficit, i.e. having insufficient energy still available to carry out the intended tasks. However, it is also possible (alternatively or in addition) for the analogue-digital converter circuit 601 to be deactivated when there is a risk of the intermediate memory component "filling up". This means that the intermediate memory has only a very limited amount of free memory still available, and it appears likely that this free memory capacity will be used up in the foreseeable future. For example, a threshold value may be defined, which value defines how much free minimum memory needs to be available in the intermediate memory component in order for the analogue-digital converter circuit to be able to remain active. Said threshold value may be set, for example, on the basis of the first data rate, at which the analogue-digital converter emits its signals to the intermediate memory component, and/or the amount of data to be transmitted per measurement cycle. Since these variables can be changed depending on the measurement task and the parameterisation of the measurement device, it is possible for the measurement device to automatically adjust the above-mentioned threshold values.

It is possible for the sensor frontend and the intermediate memory unit to always be deactivated simultaneously, or in succession: The sensor frontend is deactivated first, and later, when it has completed its tasks, the intermediate memory unit is deactivated. It is possible for this activation to always occur after a measurement cycle has been carried out. Depending on the amount of energy available, it is also possible, however, for a plurality of measurement cycles to be carried out before said deactivation occurs. It is also possible for the processor to always be activated only when a measurement cycle has finished, in order to read out the intermediate memory unit. If sufficient energy is available, it is also possible, however, for the processor to already be activated at an earlier time, and to read out the digitalised data from the intermediate memory unit. Only when the available energy falls below a specified threshold value is the frontend first deactivated, and then the intermediate memory unit, optionally simultaneously, or shortly thereafter. The measurement cycle is interrupted by a state having a deactivated processor, intermediate memory, analogue-digital converter unit and frontend. When a previously defined amount of energy is available, the measuring system then switches back into a state having an activated processor and activated intermediate memory unit. The processor completely reads out the intermediate memory unit, and deactivates the intermediate memory unit again. The processor then determines at least one measured value and outputs said value. Subsequently, said processor is also deactivated, in order that energy can be accumulated again.

Further embodiments are described hereinafter with reference to the drawings. Where the same reference signs are used in the following description of the figures, they denote the same or similar elements. The views in the drawings are schematic and not to scale.

BRIEF DESCRIPTION OF THE FIGURES

In the following description, embodiments are explained in greater detail with reference to the drawings, in which.

DETAILED DESCRIPTION OF EMBODIMENTS

Figure 1:
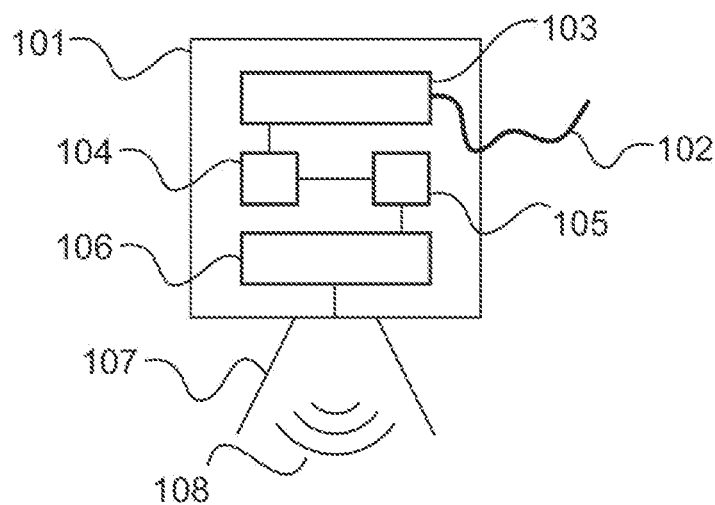
FIG. 1 shows a radar level indicator.

FIG. 1 shows essential components of a radar fill level measurement device 101 which, in the context of the disclosure, is also referred to as a radar level indicator. Modern radar fill level measurement devices are widely used in all fields of industry. In this case, in recent years there has been a transition to ever higher working frequencies, which frequencies make it possible to further reduce the geometrical size of the antennas of new radar measurement devices of this kind.

Whereas, in the early years of radar fill level measurement devices being available, initially only large process measuring tanks at a distance, to be determined, of a few metres, were of interest, sensor suppliers have recently begun to focus on tanks having dimensions of less than one metre. While, in the case of large filling material tanks, the fill level generally changes slowly, in the case of small tanks, the tank can be completely filled and/or completely emptied in a few seconds.

There is therefore a need to further increase the measurement repetition rate of new sensors. Since modern sensors are generally supplied with a specified power via a two-conductor interface, and this power budget is usually the limiting factor with regard to increasing the measurement repetition rate, the aim of more rapid measurement can be achieved only in connection with a reduction in the energy used per measurement.

It would be desirable to increase the measurement repetition rate of radar sensors and to reduce the amount of energy required per measurement cycle. In the following, devices and methods for realising said aims, and thus for overcoming the limitations and problems known hitherto, will be described.

The fill level measurement device of FIG. 1 is supplied with power via a supply line 102. At this point, the use of 4-20 mA technology is widespread, which technology makes it possible to read out the measured value, determined by the measurement device, on the basis of the supply current consumed. In connection with the supply voltages of for example 12V, which voltages are widespread in industrial facilities, in the worst case scenario a power of 48 mW results, by means of which power the entire measurement device 101 has to be operated. It is alternatively also possible, however, for the measurement device to be supplied with more power, via a supply line and a communication line in each case.

The measurement device 101 comprises a power supply unit 103 which generally also comprises energy management components, such as an energy store. The power supply unit 103 is connected to a processor 104 which is designed for controlling the sensor sequence, for evaluating the signals, and for energy management, in conjunction with the other components of the measurement device.

The measurement device further comprises a high-frequency unit 106 which emits high-frequency signals, in the range of 6 GHz, 24 GHz, 79 GHz or higher frequencies, towards a filling material surface, via a transmission and/or receiving unit 107. Furthermore, the high-frequency unit 106 receives the signal portions reflected from the filling material and/or tank fittings, and converts said signal portions into an analogue low-frequency intermediate frequency signal using known methods.

An analogue-digital converter unit 105, also referred to, within the context of the disclosure, as an analogue-digital converter circuit, converts said analogue intermediate frequency signals into digital signals, and forwards said digital signals, via a suitable interface, to the processor 104 for further evaluation.

The high-frequency unit 106 can convert the high-frequency signals into low-frequency intermediate frequency signals for example by means of pulse modulation in conjunction with a slow-motion method. It is also possible to modulate the emitted high-frequency signals with respect to the frequency in each case, and to achieve conversion into low-frequency intermediate frequency signals in accordance with the FMCW principle.

Figure 2:
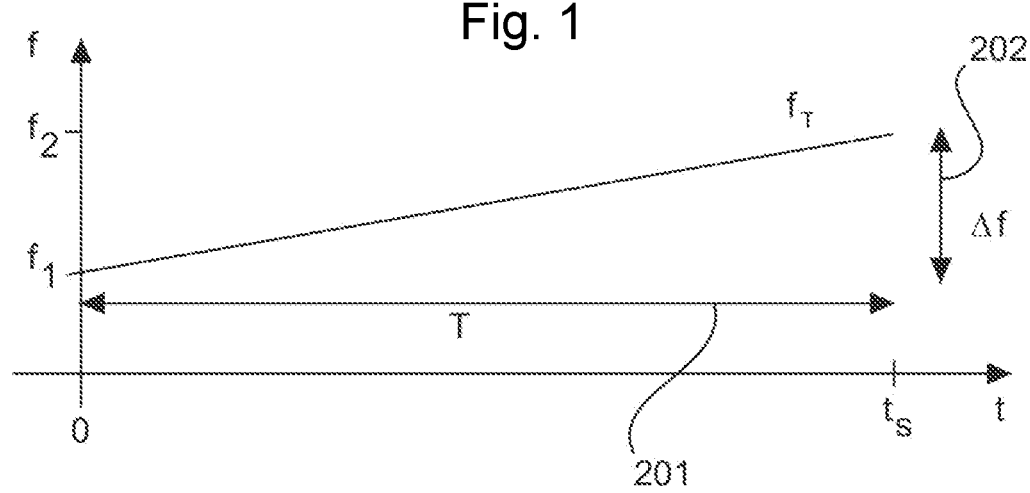
FIG. 2 shows a modulation pattern for operating a measurement device in accordance with the FMCW principle.
Figure 3:
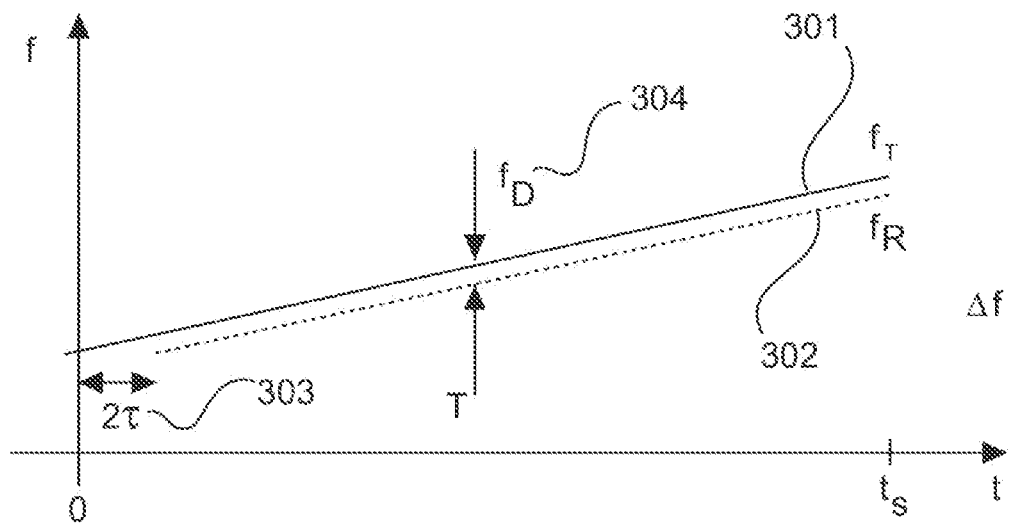
FIG. 3 shows the frequency response curve of an emitted transmission signal and the frequency response curve of the reflected received signal.

FIG. 2 shows a modulation pattern for operating a measurement device in accordance with the FMCW principle. During a measurement cycle T 201, the fill level measurement device continuously emits high-frequency signals 108 towards a filling material surface. The width of the echo detected by the measurement device is directly dependent on the bandwidth 202, and therefore, in the case of small measuring tanks, as small a frequency deviation f2−f1 as possible should be sought, in order to be able to reliably separate echoes that are very close together. Δf FIG. 3 shows the frequency response curve 301 of the emitted signal fT and the frequency response curve 302 of the signal reflected from a reflector following a delay time 2*T 303, over the progressing time during a measurement cycle 201. At each time point of the measurement, the high-frequency unit determines the difference between the frequency 301 of the transmitted signal and the frequency 302 of the received signal, using analogue circuit components. The frequency $f_D$ 304 is a measure of the distance between the reflector and the radar measurement device, and is provided at the output of the high-frequency unit 106, in the form of an intermediate frequency signal having a corresponding frequency:

$$fD = 2 * \frac{r}{c} * \frac{\Delta f}{T}$$

r being the distance between the reflector and the measurement device, and c being the propagation speed of the electromagnetic wave in the atmosphere between the transmitter and the reflector.

Figure 4:
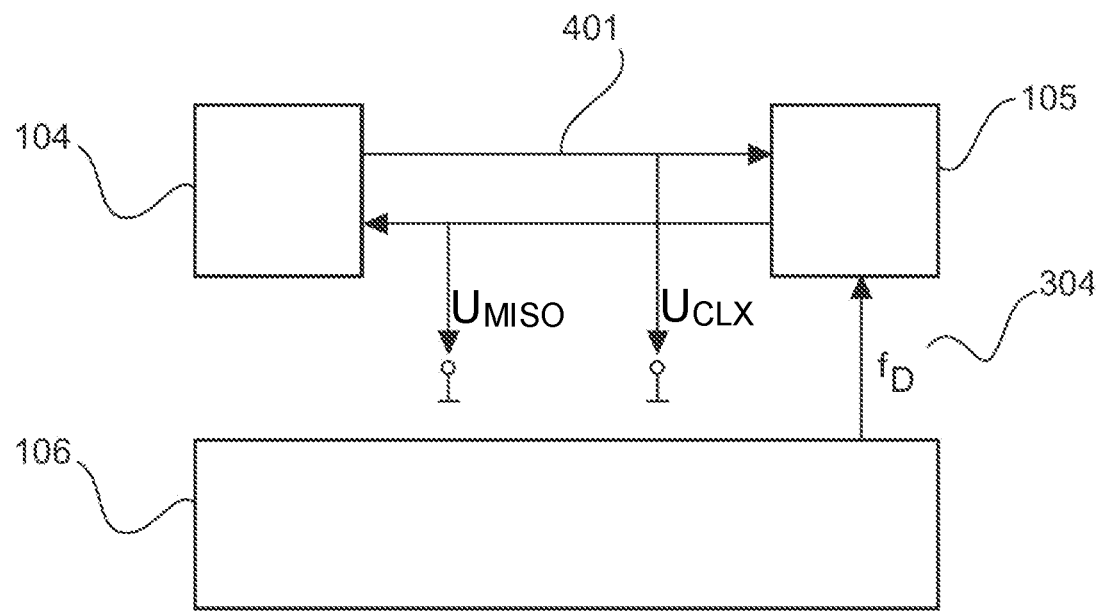
FIG. 4 shows an example of data transmission via Serial Peripheral Interface.

FIG. 4 shows further steps for processing the analogue intermediate frequency signals 304 generated in accordance with the above principle. Using an A/D converter 105, the intermediate frequency signals are digitalised at a very high degree of precision (typically 16 bit). At a measurement time 201 of typically 5 ms and a frequency deviation 202 of for example 4 GHz, measurement distances of up to 40 m result, here, in frequencies 304 in the range of 0-213 kHz.

Taking into account the Nyquist Theorem, converters having a sampling frequency of up to 500 kHz are typically used as the analogue-digital converter. The data acquired must be transmitted to a processor 104 in real time during the measurement. Since the criterion of energy efficiency plays a significant role when selecting a suitable processor 104, said processors generally do not comprise high speed interfaces, but instead comply with typical asymmetric IO Standards, such as Serial Peripheral Interface ("SPI") or Inter-Integrated Circuit ("IIC").

FIG. 4 shows the example of data transmission via SPI. Via a clock line 401, the processor clocks the data transmission from the ND converter 105 at a sufficient speed, i.e. in the example above at a clock rate>16 bit*500 kHz/bit=8 MHz. It is already clear at this point that the processor must therefore be capable of providing this frequency. Problems arise here in conjunction with the aim of operation that is as energy-saving as possible, and which rather requires low-frequency clocking of the processor and the peripherals thereof. Moreover, the data transmission via an asymmetric interface cannot be of any desired speed relative to the clock rate, since the smallest amounts of EMC noise can rapidly lead to a bit error.

Available ND converters having working frequencies of over 1 GHz therefore mainly comprise differential or symmetric outputs in order to be able to achieve the high data rates in a manner that is reliable in terms of circuit technology, during the analogue-digital conversion.

Figure 5:
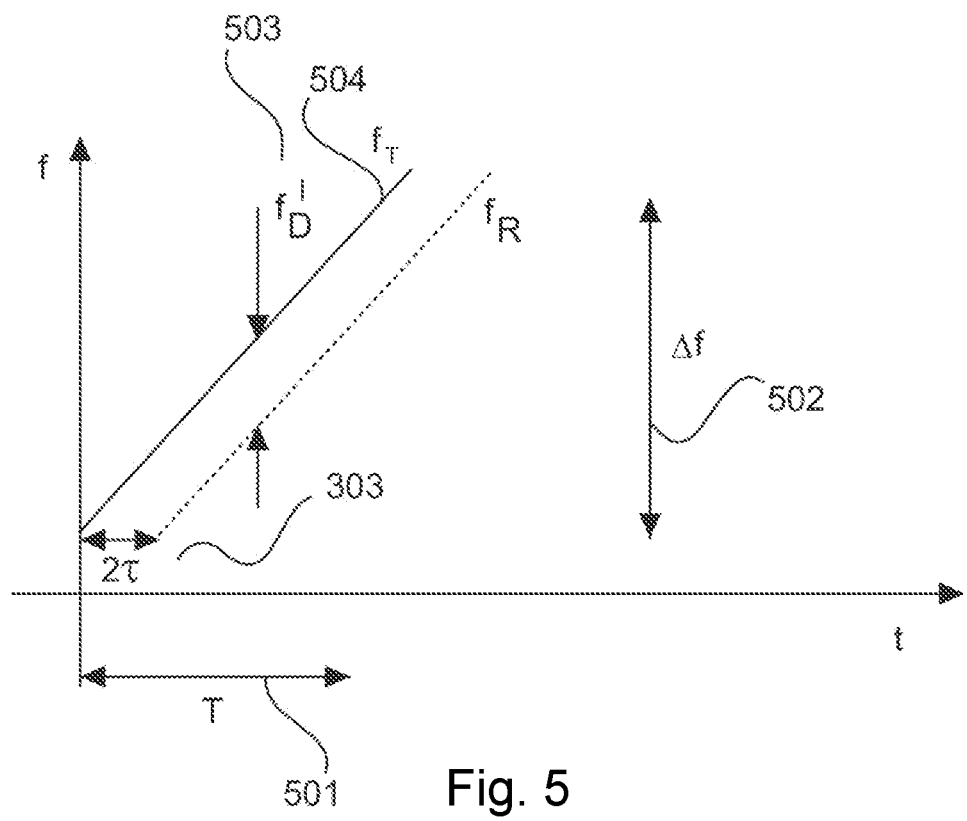
FIG. 5 shows an example of a measurement sequence.

FIG. 5 shows a measurement sequence of a fill level measurement device according to the FMCW method, which sequence is optimised for small tanks. Compared with the operating mode of FIG. 3, the measurement time T 501 has been hugely reduced, in view of more rapid measured value determination and a reduction in the energy consumption of the high-frequency elements. For example, measurement times of a few hundred microseconds are sought here.

In addition, the bandwidth 502 has been increased, in order to be better able to separate echoes that are close together. Δf Each of the measures described contributes to the respective frequencies of the intermediate frequency signals 503 provided by the high-frequency unit 106 being significantly increased compared with the operating mode of FIG. 3. In the present example, a desirable frequency deviation of 10 GHz and a measurement time of 500 μs already results in echoes at a distance of 2 m from the intermediate frequency signals and having a frequency of 1.4 MHz. It is clear that rapid analogue-digital converters having high clock frequencies are of essential importance for the intended optimisation of the radar measurement devices. However, converters of this kind generally have to be connected to a processor via a differential digital interface. Corresponding processors having an input interface of this kind are unsuitable for use in fill level measurement devices with respect to the power required.

It would be desirable to provide a circuit layout and a method which make it possible to use rapid analogue-digital converters in fill level measurement devices.

Figure 6:
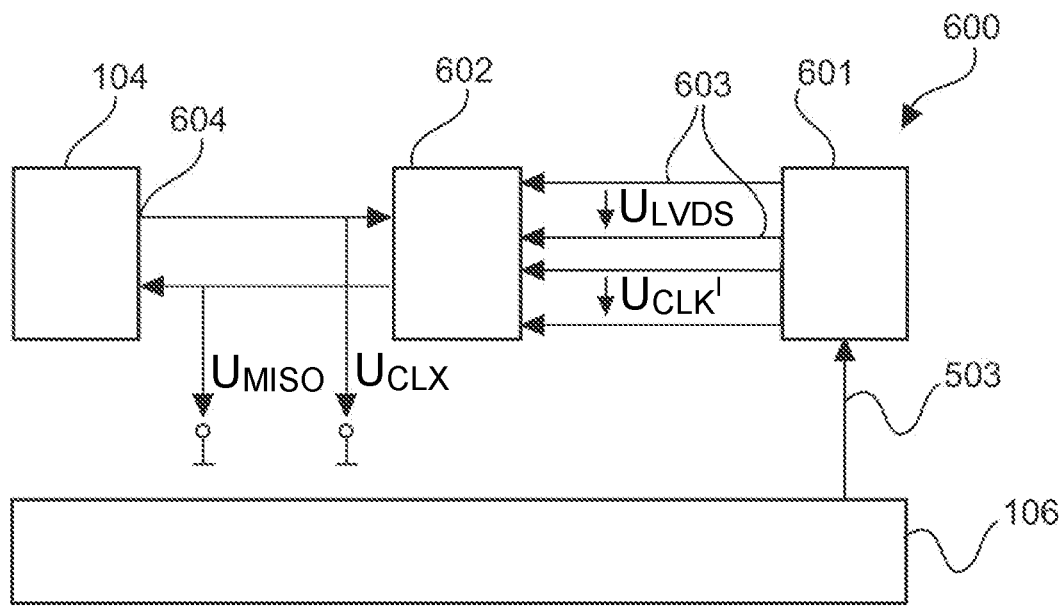
FIG. 6 shows a measurement device circuit for a measurement device according to an embodiment.

FIG. 6 shows a corresponding circuit layout. An ND converter 601 having a high sampling rate is used to convert the intermediate frequency signals 503. The ND converter 601 comprises a differential interface that is suitable for high clock rates, for example an LVDS interface. Since the signal processing and/or control processor 104 itself cannot read in differential signals at high speed, a programmable logic component 602 is used as an intermediate element.

The logic component 602 is programmed at the factory so as to read the data from the ND converter into a FIFO memory 602 in real time. The processor 104 can access the programmable logic component 602, and in this case in particular the FIFO memory within the programmable logic component, and read out data therefrom, via an asymmetric interface, for example an SPI interface. The FIFO memory within the programmable logic component 602 can be designed to temporarily store the digital data of the ND converter for a complete measurement cycle 501. It is also possible to design the FIFO memory as a circular buffer of a smaller size, and to make use of the fact that the processor 104 can already read out some of the digital sampling values from the FIFO memory during the measurement process.

The programmable logic components used may have sufficient energy-management functions which allow for use in a two-conductor radar fill level measurement device.

Figure 10:
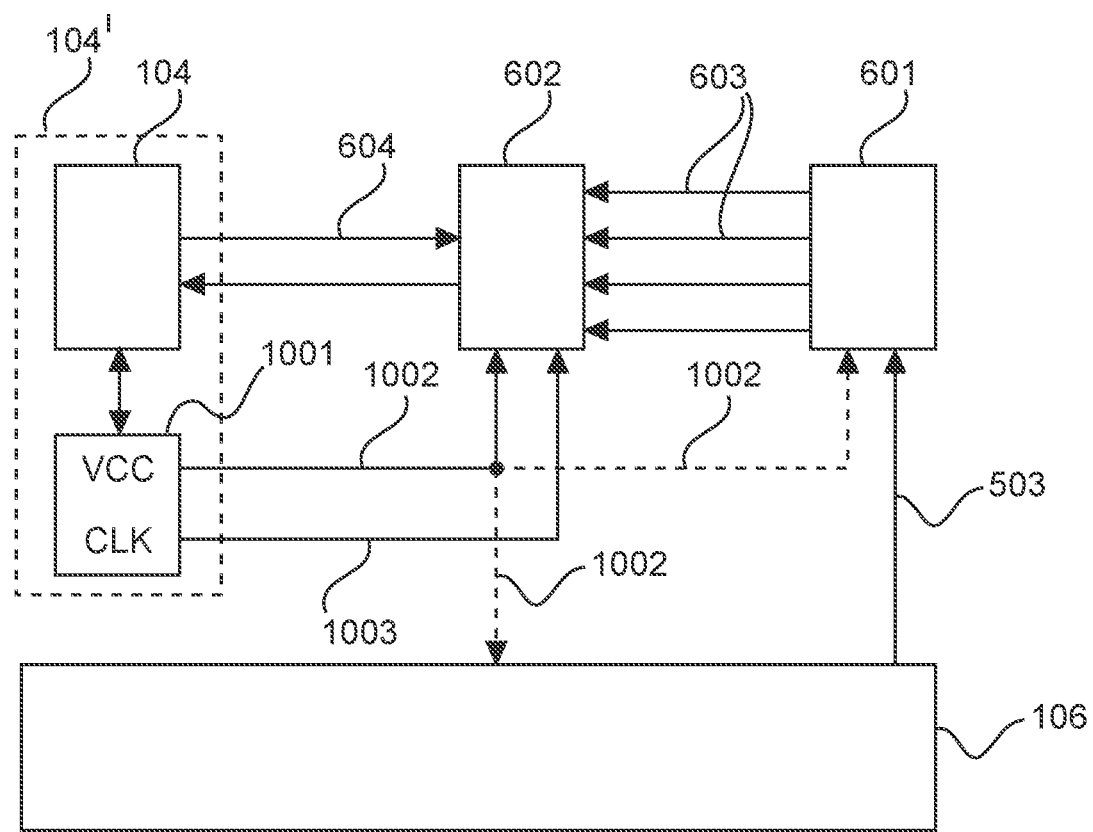
FIG. 10 shows a measurement device circuit for a measurement device according to an embodiment.

The following description relates in particular to the embodiment of FIG. 10. It is possible, in a first operating phase, to supply the programmable logic components 602 and/or the high-frequency unit 106 and/or the A/D converter 601 used with an external clock signal 1002 from a supply voltage source or clock signal source 1001, and to thus allow for data to be acquired, processed and/or output. It is possible, in a second operating phase, to separate the programmable logic component and/or the high-frequency unit 106 and/or the A/D converter 601 from an external clock signal, to deactivate the external clock signal and/or to reduce the voltage thereof.

Programmable logic components that are designed accordingly are capable of obtaining the memory contents, which represent the logic program of the processing logic and/or the acquired data in the component, even if there is no operating clock signal. Energy can thus be saved. When a specifiable amount of energy is available, changing over to the first operating phase makes it possible to achieve seamless continuation of the measurement sequence without it being necessary to reprogram the programmable logic component. It is also possible to seamlessly continue a calculation routine, already begun, for processing the data.

It is possible, alternatively and/or in addition, to save energy by separating the programmable logic component from a supply voltage 1002 and/or by reducing the supply voltage 1003 during a fourth operating phase. When a specifiable amount of energy is available, the programmable logic component can be reconnected to a supply voltage by means of changing over to a third operating phase. In this way, following reconfiguration by means of a master control unit, for example a processor, the function of the intermediate memory component can be re-established.

The processor 104 may be designed to coordinate the entirety of the control of the flows of energy and clock pulses in the measurement device. It is thus in particular also possible for the above-described operating modes of the first, second, third and/or fourth operating phase to be activated in succession or in parallel. The clock signal source 1001 can be integrated in the processor circuit 104'.

A development of the energy management in the fill level measurement device can thus achieve an operating sequence that further improves the energy-efficient use of programmable logic components in the signal acquisition branch.

Figure 7:
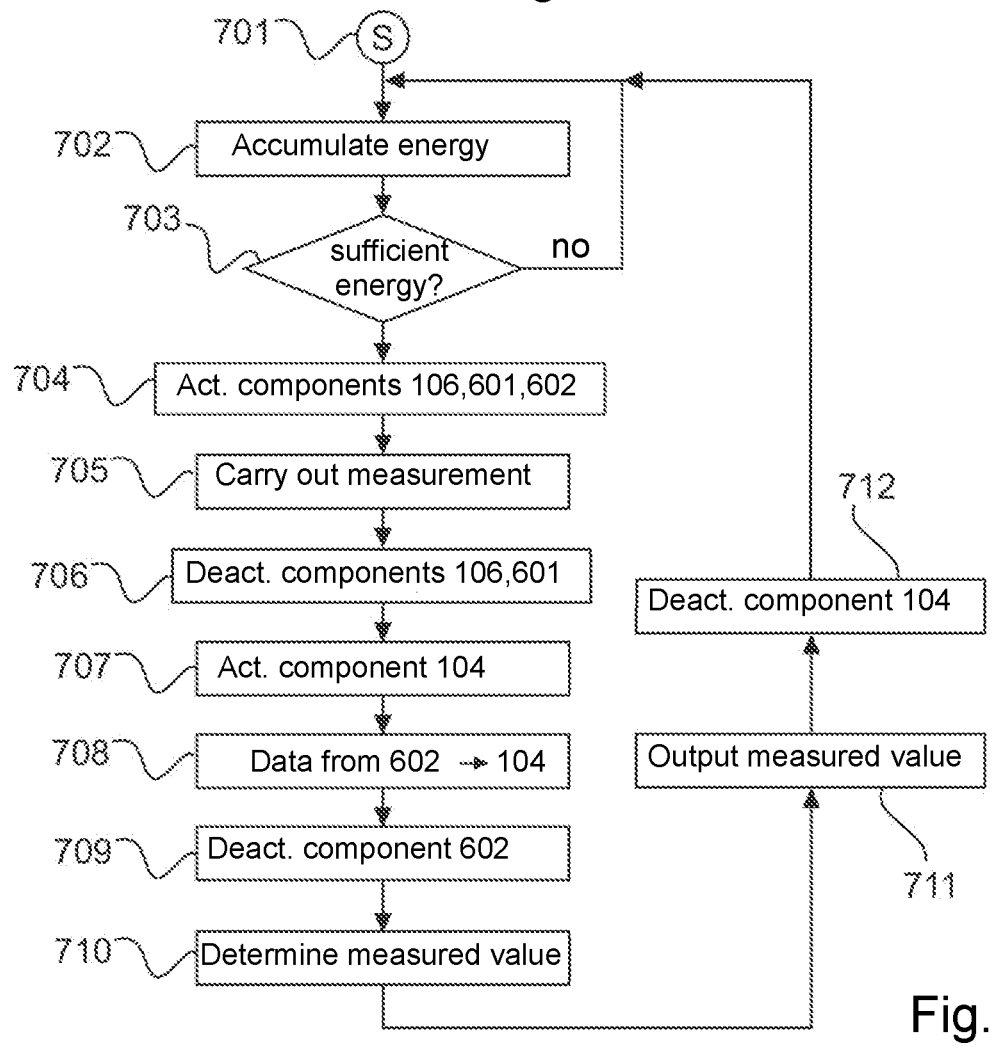
FIG. 7 is a flow chart of a method according to an embodiment.

FIG. 7 is a first flow diagram for operating a measurement device according to an embodiment. The method starts in the starting state 701, in which all the components are in a deactivated, i.e. energy-saving, operating state. Energy is first accumulated within the power supply 103. As soon as enough energy is available to carry out a measurement, the high-frequency unit 106, the A/D converter 601 and the programmable logic component 602 are put into a normal operating mode. According to the diagram in FIG. 5, a measurement is carried out in step 705. Leaving aside some processing time, the measured values acquired in the process are transferred almost synchronously into the memory of the programmable logic component 602. In step 706, the high-frequency unit 106 and the analogue-digital converter unit 601 are immediately deactivated again, i.e. put into an energy-saving state. In step 707, the processor 104 is awoken from its SLEEP mode in order, in step 708, to read the digital measurement data out from the programmable logic component 602. In step 709, the logic component 602 is deactivated, whereupon, in step 710, the processor 104 determines the measured value in accordance with known methods. In step 711, the measured value is provided externally, for example in the form of a loop current within the line 102. In step 712, the processor is again put into an energy-saving mode, and the method continues with the step of energy accumulation 702.

Figure 8:
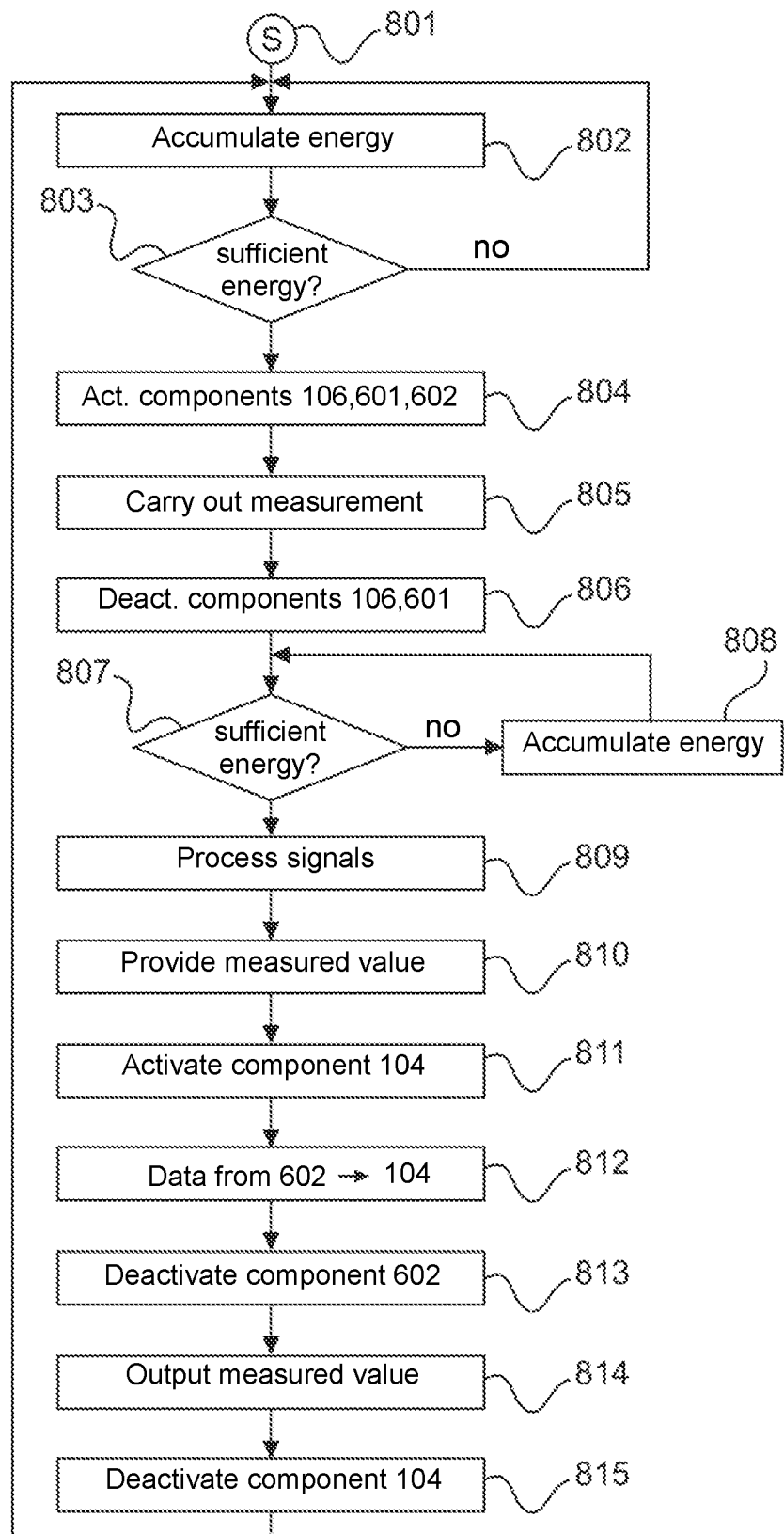
FIG. 8 is a flow chart of a method according to a further embodiment.

In a further embodiment, it is also possible for the programmable logic unit to take on one or more parts of the processing of the digitalised echo signals. FIG. 8 illustrates a method according to another embodiment. The method starts in the initial state 801, in which the components 104, 601, 602, 106 are deactivated, i.e. in an energy-saving state. In step 802, the power supply unit 103 first accumulates energy, for example in a capacitor within the unit 103. As soon as it is detected, in step 803, that sufficient energy is available, the programmable logic component 602, the analogue-digital converter unit 601 and the high-frequency unit 106 are activated in step 804. In step 805, by emitting one or more transmission ramps 301, 504, one or more echo curves are acquired, according to known methods, and converted into digital sampling values by the analogue-digital converter 601. The digital sampling values are transmitted to the programmable logic component 602 in a substantially time-synchronous manner and via a symmetrical signal transmission line 603 and stored in said logic component. In step 806, both the high-frequency unit 106 and the analogue-digital converter unit 601 are deactivated in order to save energy. In step 807, a check is carried out as to whether there is sufficient energy available within the programmable logic component 602 in order to start the signal processing. If this is not the case, energy is first accumulated in step 808. It is possible, in this case, to put the programmable logic component into an energy-saving state in which the memory contents and the measured values are retained. As soon as enough energy is available, the actual processing of the signals in the programmable logic component 602 is started in step 809. Since highly parallelised algorithms, such as filterings or fast Fourier transforms, are generally used for this purpose, reproducing these method steps in specialised hardware blocks within the unit 602 can save a significant amount of calculation time, which can reduce the energy consumption of the sensor. In this case, it may also be possible to implement some of the signal processing using procedural software logic, within a soft-core processor in the component 602. In step 810, at least one, or even more, measured values are provided within the component 602. Subsequently, in step 811 the processor unit 104, which, within the context of the disclosure, is also referred to as the processor, is activated and, in step 812, the at least one measured value is transmitted via at least one asymmetrical signal connection 604. It should be noted, at this point, that the amount of data to be transmitted is very small in this case, and therefore very slow transmission standards can be used here. In step 813, the programmable logic component is deactivated again, before the at least one measured value is provided externally, for example by the power supply unit 103, in step 814. Finally, in step 815, the processor 104 is again put into an energy-saving state.

At this point, it should be noted that the processor unit 104 can also be part of the power supply unit 103. It may furthermore be possible to implement the processor unit 104 and the programmable logic unit 602 within a chip. In this case, the asymmetric transmission of data is made possible by means of direct access to the memory locations, using an internal bus system, within a correspondingly programmed logic component 602. It should further be noted that the analogue-digital converter unit 601 and the high-frequency unit 106 can also be accommodated in a common chip and/or chip housing.

The present embodiments can advantageously be used for fill level measurement, in conjunction with energy-saving two-conductor sensors. However, it should in particular also be noted that the scope of the present embodiments can also be used in what are known as four-conductor sensors. The embodiments can also be used in particular for what are known as multi-channel radar systems, for example for determining the topology of a bulk material surface.

Finally, it should be noted that, in a further embodiment, the programmable logic unit 602 can be implemented by a functionally identical, application-specific circuit ("ASIC").

Figure 9A:
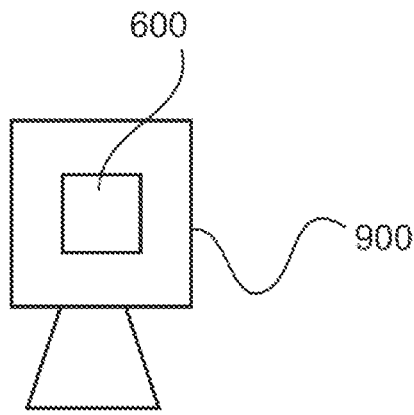
FIGS. 9A, 9B, 9C and 9D show measurement devices according to embodiments.
Figure 9B:
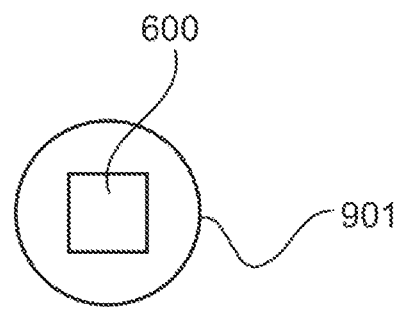
Figure 9C:
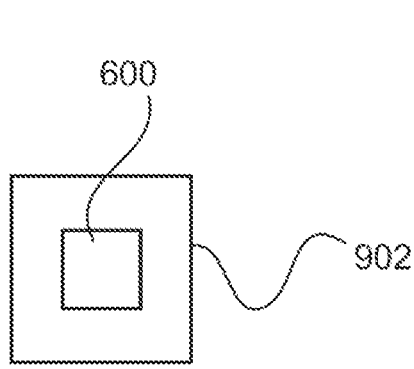
Figure 9D:
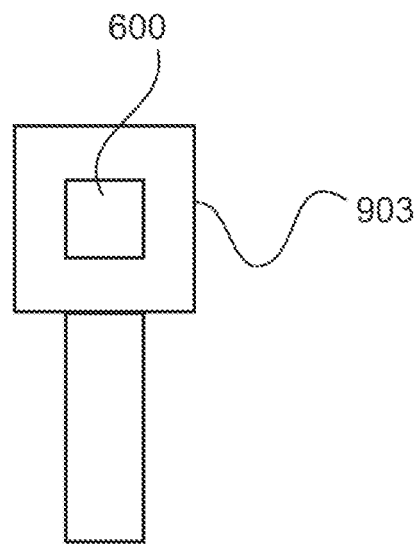

FIG. 9A shows a radar level indicator 900 comprising a measurement device circuit 600 according to an embodiment. The measurement device may be designed for three-dimensional fill level measurement, in which the topology of the filling material surface can be determined by scanning the surface. Alternatively, the measurement device may be designed for use in a vehicle in order to acquire data on the surroundings of the vehicle. FIG. 9B shows a pressure measurement device 901 comprising a measurement device circuit 600. FIG. 9C shows a flow measurement device 902 comprising a measurement device circuit 600, and FIG. 9D shows a limit level sensor 903 comprising a measurement device circuit 600.

For the sake of completeness, it should be noted that "comprising" and "having" do not exclude the possibility of other elements or steps, and the use of the indefinite article "a", or "an", does not exclude the possibility of a plurality. It should further be pointed out that features or steps described with reference to one of the above embodiments may also be used in combination with other features or steps of other above-described embodiments. Reference numerals in the claims should not be treated as limiting.

The invention claimed is:

1. A method for fill level measurement, limit measurement, pressure measurement or flow measurement, in which measurement data are acquired and processed, said method comprising:
   acquiring fill level, limit level, pressure or flow measurement data;
   activating an intermediate memory by supplying the intermediate memory with an external operating clock signal and/or supply voltage;
   receiving, in the intermediate memory, digital signals from an analogue-digital converter circuit at a first data rate, the digital signals corresponding to the acquired fill level, limit level, pressure or flow measurement data;
   activating a processor after receiving the digital signals in the intermediate memory;
   reading out, by the processor, data from the intermediate memory at a second data rate that is smaller than the first data rate;
   deactivating the intermediate memory by separating the intermediate memory from the external operating clock signal and/or the external supply voltage;
   calculating, by the processor and after deactivating the intermediate memory, a measured value from the digital signals and outputting the measured value;
   putting the processor into a sleep mode; and
   activating the intermediate memory.

2. A non-transitory computer-readable medium, having stored thereon a program element that when executed by a computer causes the computer to implement the method according to claim 1.

3. The fill level measurement according to claim 1, wherein the measured value calculated by the processor is a limit measurement.

4. The fill level measurement according to claim 1, wherein the measured value calculated by the processor is a pressure measurement.

5. The fill level measurement according to claim 1, wherein the measured value calculated by the processor is a flow measurement.

6. A radar level indicator, comprising:
   at least one processor;
   at least one analogue-digital converter circuit; and
   at least one intermediate memory that is arranged between the processor and the analogue-digital converter circuit,
   wherein the intermediate memory is activated by a supplied external operating clock signal and/or supply voltage and deactivated by separating the intermediate memory from the external operating clock signal and/or the external supply voltage,
   wherein the intermediate memory is configured to receive digital signals from the analogue-digital converter circuit at a first data rate, the digital signals corresponding to acquired fill level, limit level, pressure or flow measurement data,
   wherein the processor is configured to read out the intermediate memory at a second data rate that is smaller than the first data rate,
   wherein the processor is configured to, after the intermediate memory is deactivated, calculate a measured value from the digital signals and output the measured value, and
   wherein the processor is put into a sleep mode and the intermediate memory is activated in response to the output of the measured value.

7. The radar level indicator according to claim 6, wherein the first data rate is higher than the second data rate.

8. The radar level indicator according to claim 6, wherein the analogue-digital converter circuit comprises a differential interface and is configured to generate the digital signals in the form of a differential output signal.

9. The radar level indicator according to claim 6, wherein the intermediate memory comprises a programmable logic component.

10. The radar level indicator according to claim 6, wherein the digital signals are digital sampling values of a received signal of the radar level indicator.

11. The radar level indicator according to claim 6, wherein the intermediate memory is configured to process the received digital signals.

12. The radar level indicator according to claim 6, wherein the intermediate memory comprises a first in, first out memory and/or a circular buffer.

13. The radar level indicator according to claim 6, wherein the processor is configured to connect to a 4-20 mA two-conductor interface supplying power and outputting the measured values.

14. A method for fill level measurement, limit measurement, pressure measurement or flow measurement, in which measurement data are acquired and processed, said method comprising:
   acquiring fill level, limit level, pressure or flow measurement data;
   in response to the acquiring, activating an intermediate memory by supplying the intermediate memory with an external operating clock signal and/or supply voltage;
   receiving, in the intermediate memory, digital signals from an analogue-digital converter circuit at a first data rate, the digital signals corresponding to the acquired fill level, limit level, pressure or flow measurement data;
   in response to the receiving the digital signals in the intermediate memory, activating a processor;
   reading out, by the processor, data of the digital signals from the intermediate memory at a second data rate that is lower than the first data rate;
   in response to the reading out, deactivating the intermediate memory by separating the intermediate memory from the external operating clock signal and/or the external supply voltage;
   calculating, by the processor and after deactivating the intermediate memory, a measured value from the digital signals and outputting the measured value; and
   in response to the outputting, putting the processor into a sleep mode and activating the intermediate memory.

15. The method according to claim 14, wherein the data of the digital signals read out by the reading out step is unmodified.

\* \* \* \* \*